United States Patent
Tulshibagwale et al.

(10) Patent No.: US 11,606,357 B2
(45) Date of Patent: Mar. 14, 2023

(54) PERVASIVE RESOURCE IDENTIFICATION

(71) Applicant: Google LLC, Mountain View, CA (US)

(72) Inventors: Atul Tulshibagwale, Mountain View, CA (US); Sachin Subhashrao Parsewar, Cupertino, CA (US); Amit Singla, Mountain View, CA (US)

(73) Assignee: Google LLC, Mountain View, CA (US)

( * ) Notice: Subject to any disclaimer, the term of this patent is extended or adjusted under 35 U.S.C. 154(b) by 174 days.

(21) Appl. No.: 17/118,512

(22) Filed: Dec. 10, 2020

(65) Prior Publication Data
US 2022/0191200 A1 Jun. 16, 2022

(51) Int. Cl.
*H04L 29/06* (2006.01)
*H04L 9/32* (2006.01)
*H04L 9/40* (2022.01)

(52) U.S. Cl.
CPC ........ *H04L 63/0876* (2013.01); *H04L 9/3213* (2013.01); *H04L 63/0236* (2013.01); *H04L 63/20* (2013.01)

(58) Field of Classification Search
CPC ............... H04L 63/0236; H04L 9/3213; H04L 63/0407; H04L 63/083; H04L 63/08; H04L 63/20; H04L 63/0876; H04L 9/3271
See application file for complete search history.

(56) References Cited

U.S. PATENT DOCUMENTS

| | | | | |
|---|---|---|---|---|
| 9,692,742 | B1 * | 6/2017 | VanLund | ............ H04L 67/1097 |
| 9,710,808 | B2 * | 7/2017 | Slepinin | ............. G06Q 20/3829 |
| 10,116,663 | B2 | 10/2018 | Karunakaran et al. | |
| 2012/0260322 | A1 * | 10/2012 | Logan | ..................... G06F 21/33 726/6 |
| 2014/0082715 | A1 * | 3/2014 | Grajek | ................ H04W 12/068 726/8 |
| 2015/0254659 | A1 * | 9/2015 | Kulkarni | .............. G06Q 20/325 705/44 |

(Continued)

OTHER PUBLICATIONS

Apr. 4, 2022 Written Opinion (WO) of the International Searching Authority (ISA) and International Search Report (ISR) issued in International Application No. PCT/US2021/062542.

*Primary Examiner* — Mohammad A Siddiqi
(74) *Attorney, Agent, or Firm* — Honigman LLP; Brett A. Krueger

(57) ABSTRACT

A method for pervasive resource identification includes receiving an authentication request from a first application service. The authentication request requests authentication of a user of a user device. The method includes obtaining device information associated with the user device of the user and generating a unique opaque identifier for the user device based on the device information. The method includes obtaining authentication credentials from the user device. The authentication credentials verify an identity of the user. In response to receiving the authentication credentials from the user device, the method includes generating an authentication token and encoding the unique opaque identifier into the authentication token. The method also includes transmitting the authentication token to the first application service. The authentication token, when received by the first application service, allows the first application service to adjust an interaction with the user device based on the unique opaque identifier.

20 Claims, 7 Drawing Sheets

(56) References Cited

U.S. PATENT DOCUMENTS

| | | | |
|---|---|---|---|
| 2015/0310194 A1* | 10/2015 | Zhang | G06F 21/31 |
| | | | 726/9 |
| 2018/0139187 A1* | 5/2018 | Mays | G06F 21/6254 |
| 2019/0333055 A1* | 10/2019 | Mohammed | H04L 9/3271 |
| 2020/0084036 A1* | 3/2020 | Rowe | H04L 63/0807 |
| 2020/0153829 A1* | 5/2020 | Seibert, Jr. | H04L 63/0815 |
| 2020/0252399 A1 | 8/2020 | Hancock et al. | |
| 2021/0136058 A1* | 5/2021 | Lopez | H04L 63/0853 |
| 2021/0185531 A1* | 6/2021 | Avetisov | H04L 9/3218 |
| 2022/0171832 A1* | 6/2022 | Gallagher | H04L 9/0866 |

\* cited by examiner

PERVASIVE RESOURCE IDENTIFICATION

TECHNICAL FIELD

This disclosure relates to pervasive resource identification.

BACKGROUND

Representational state transfer (REST) application programming interfaces (APIs) are computing interfaces often used to enable independent systems to communicate about resources of common interest. For example, two independent systems often communicate about a user session or a device being used by a user (e.g., a mobile user device). These resources are typically identified by the API requiring the application's presence within that resource. When an API caller wishes to address a shared resource without such a presence, then the API caller must use an alternative means, such as identifying the user account stored at an API server and associated with the user.

SUMMARY

One aspect of the disclosure provides a method for pervasive resource identification. The method includes receiving, at data processing hardware, an authentication request from a first application service. The authentication request requests authentication of a user of a user device. The method also includes obtaining, at the data processing hardware, device information associated with the user device of the user and generating, by the data processing hardware, a unique opaque identifier for the user device based on the device information. The method includes obtaining, at the data processing hardware, authentication credentials from the user device. The authentication credentials verify an identity of the user. In response to receiving the authentication credentials from the user device, the method includes generating, by the data processing hardware, an authentication token and encoding, by the data processing hardware, the unique opaque identifier of the user device into the authentication token. The method also includes transmitting, by the data processing hardware, the authentication token to the first application service. The authentication token, when received by the first application service, allows the first application service to adjust an interaction with the user device based on the unique opaque identifier.

Implementations of the disclosure may include one or more of the following optional features. In some implementations, the method further includes receiving, at the data processing hardware, a second authentication request from a second application service. The second authentication request requests authentication of the user of the user device. The method in this implementation also includes obtaining, at the data processing hardware, the device information associated with the user device of the user and determining, by the data processing hardware, that the device information is associated with the unique opaque identifier of the user device. The method in this implementation also includes generating, by the data processing hardware, a second authentication token, encoding, by the data processing hardware, the unique opaque identifier into the second authentication token, and transmitting, by the data processing hardware, the second authentication token to the second application service. In some examples, the first application service determines that the second application service received the same unique opaque identifier as the first application service and the first application service determines, based on the unique opaque identifier, that the first application service and the second application service are interacting with the same user device.

Optionally, the method further includes receiving, by the data processing hardware, an information request from the first application service requesting the device information. The information request includes the unique opaque identifier. The method may also include transmitting, by the data processing hardware, to the first application service, at least a portion of the device information associated with the user device of the user based on the unique opaque identifier. In some examples, the method further includes, after receiving the authentication request from the first application service, transmitting, by the data processing hardware, a credentials request to the user device requesting the authentication credentials and user consent to share the device information associated with the user device with the first application service and receiving, by the data processing hardware, a response to the credentials request including the authentication credentials and the user consent.

In some implementations, the device information includes at least one of: a web cookie of the user device; an Internet Protocol address of the user device; or an operating system version of the user device. The authentication token may include a federated identity token. For example, the federated identity token includes one of an OAuth token or a Security Assertions Markup Language (SAML) token Optionally, the federated identity token includes a proprietary or standards-based federated identity systems token. In some examples, encoding the unique opaque identifier into the authentication token includes adding the unique opaque identifier as an attribute of the authentication token Optionally, the user is associated with a plurality of user devices and each user device of the plurality of user devices is associated with a different unique opaque identifier.

Another aspect of the disclosure provides a system for pervasive resource identification. The system includes data processing hardware and memory hardware in communication with the data processing hardware. The memory hardware stores instructions that when executed on the data processing hardware cause the data processing hardware to perform operations. The operations include receiving an authentication request from a first application service. The authentication request requests authentication of a user of a user device. The operations also include obtaining device information associated with the user device of the user and generating a unique opaque identifier for the user device based on the device information. The operations include obtaining authentication credentials from the user device. The authentication credentials verify an identity of the user. In response to receiving the authentication credentials from the user device, the operations include generating an authentication token and encoding the unique opaque identifier into the authentication token. The operations also include transmitting the authentication token to the first application service. The authentication token, when received by the first application service, allows the first application service to adjust an interaction with the user device based on the unique opaque identifier.

This aspect may include one or more of the following optional features. In some implementations, the operations further include receiving a second authentication request from a second application service. The second authentication request requests authentication of the user of the user device. The operations in this implementation also include obtaining the device information associated with the user device of the user and determining that the device information is associated with the unique opaque identifier of the user device. The operations in this implementation also include generating a second authentication token, encoding the unique opaque identifier into the second authentication token, and transmitting the second authentication token to the second application service. In some examples, the first application service determines that the second application service received the same unique opaque identifier as the first application service and the first application service determines, based on the unique opaque identifier, that the first application service and the second application service are interacting with the same user device.

Optionally, the operations further include receiving an information request from the first application service requesting the device information. The information request includes the unique opaque identifier. The operations may also include transmitting, to the first application service, at least a portion of the device information associated with the user device of the user based on the unique opaque identifier. In some examples, the operations further include, after receiving the authentication request from the first application service, transmitting a credentials request to the user device requesting the authentication credentials and user consent to share the device information associated with the user device with the first application service and receiving a response to the credentials request including the authentication credentials and the user consent.

In some implementations, the device information includes at least one of a web cookie of the user device; an Internet Protocol address of the user device; or an operating system version of the user device. The authentication token may include a federated identity token. For example, the federated identity token includes one of an OAuth token or a Security Assertions Markup Language (SAML) token. Optionally, the federated identity token includes a proprietary or standards-based federated identity systems token. In some examples, encoding the unique opaque identifier into the authentication token includes adding the unique opaque identifier as an attribute of the authentication token. Optionally, the user is associated with a plurality of user devices and each user device of the plurality of user devices is associated with a different unique opaque identifier.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

In modern systems, multiple services need to be able to communicate with each other about shared resources. For example, multiple services, potentially owned and/or operated by different organizations, often desire to read or update information about the device a shared user is using. Multiple services that require to identify such a shared resource need to provide some secondary identification to each other in order to agree on the same resource.

In some situations, two application services (i.e., applications) executing on the same user device want to communicate with one another or two application services executing on different remote computing devices (e.g., servers) want to communicate about the user device of a shared user. For example, a first application service may want to obtain a security risk posture of the user device from a second application service before performing a service for the user. However, application services executing on or in communication with some user devices are unable to obtain a unique device identifier for the user device because of privacy or security concerns. Thus, it can be difficult for two independent applications to determine that each is executing in the same execution environment (i.e., on the same user device) or communicating with the same user device.

In some techniques, these resources are typically identified by an API calling the application's presence within that resource. When an API caller wishes to address a shared resource without such a presence, then the API caller must use an alternative means, such as identifying the user account stored at an API server and associated with the user. However, privacy concerns may prevent the API caller from discovering such information. Other techniques require another application installed on the user device that coordinates resource identification for the current user accessing the user device.

Implementations herein are directed toward a system for pervasive resource identification that allows application services (i.e., applications executing on data processing hardware of one or more computing devices) to obtain a unique opaque identifier (ID) to correlate an execution environment of a user device. An ID generator obtains device information from the user device associated with a user and generates a unique opaque ID for the user device based on the device information. An authenticator obtains authentication credentials from the user device and the authenticator generates an authentication token encoding the unique opaque identifier. The authenticator transmits the authentication token to an application service allowing the application service to adjust interactions with the user device based on the unique opaque ID.

Figure 1:
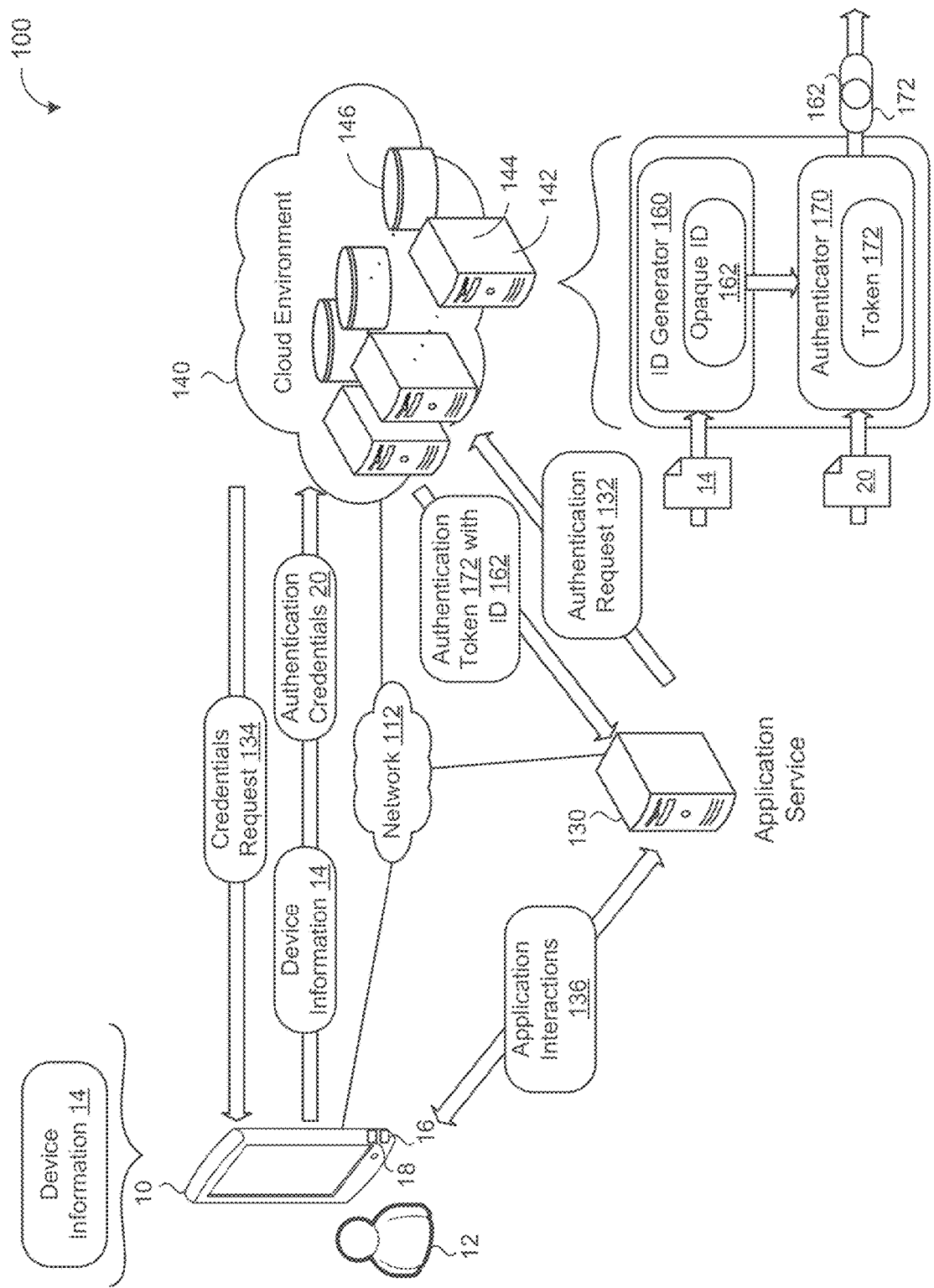
FIG. 1 is a schematic view of an example system for pervasive resource identification.

Referring now to FIG. 1, in some implementations, an example system 100 includes a user device 10 associated with a respective user 12 in communication with a remote system 140 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 142 including computing resources 144 (e.g., data processing hardware) and/or storage resources 146 (e.g., memory hardware) The remote system 140 executes an ID generator 160.

The ID generator 160 obtains device information 14 associated with the user device 10 of the user 12. The device information 14 represents information regarding the user device 10 that, when taken together in aggregate, help to uniquely identify the user device 10. That is, the device information 14 ideally includes multiple pieces of information that each individually is insufficient to uniquely identify the user device 10, but when taken together, the multiple pieces of information of the device information 14 represent a unique (or near-unique) identifier for the user device 10. For example, the device information 14 includes pieces of information such as operating system (OS) type, OS version, OS patch level, web cookies, an Internet Protocol (IP) address, installed application information, etc. The device information 14 may include only information typically permitted to installed applications and does not encompass personally identifiable information (PII). For example, many OSes restrict installed applications from accessing or sharing sensitive information. Instead, the ID generator 160 receives device information 14 that is not restricted and does not include sensitive information regarding the user 12.

The ID generator 160, based on the device information 14, generates a unique opaque ID 162 for the user device 10 that provides no information about the user device directly. That is, the opaque ID 162 does not include any identifying information regarding the user device 10 or user 12, but instead, serves as an identifier for an entity of the remote system 140 to identify the particular user device 10. For example, the opaque ID 162 includes a random string of numbers and/or letters that the entity of the remote system 140 uses to associate the device information 14 obtained from the particular user device 10.

The remote system 140 also executes an authenticator 170. The authenticator 170 receives, from an application service 130, an authentication request 132 requesting authentication of the user 12 of the user device 10. The application service 130 may be an application executing on any computing device (e.g., a server) that hosts a service or application associated with the user 12 or the user device 10 that communicates with the remote system 140 via the same or different network 112. In some implementations, the application service 130 is in communication with an associated application installed and executing on the user device 10. In other implementations, the application service 130 executes on the user device 10 and is in communication with another application installed on the user device 10 and/or a remote computing device. A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications. For example, the application service 130 may host a web storage application (e.g., for pictures, documents, etc.) that the user 12 uses, via the user device 10 (e.g., via a web browser or an application specific to the application service 130), to store files. In some examples, the application service 130 is associated with the remote system 140 and in other examples, the application service 130 is wholly independent of the remote system 140.

More and more commonly, many web-hosted services and applications are relying on federated identity technology to manage and authenticate user access. For example, a user maintains authentication credentials (e.g., a username and a password) with a single federated identity service. When the user wishes to access an account or resource associated with the user at a third party service, the third party service requests the federated identity service to authenticate the user. In this way, the user need only maintain a single set of authentication credentials while the third party service does not need to maintain proper authentication services and security and instead relies upon the federated identity service.

Here, the remote system 140 may act as a federated identity service and the authentication token 172 may include a federated identity token. That is, the application service 130 requests the authenticator 170 to authenticate the user 12 so that the user 12 may access a resource associated with the application service 130. The application service 130 may send the authentication request 132 to the remote system 140 in response to a selection or indication from the user 12. For example, the user 12, when attempting to access the resource associated with the application service 130, selects an option to authenticate via the federated identity service (i.e., the authenticator 170). The remote system 140 may use any sort of federated identity technologies such as OAuth, OpenID Connect, and Security Assertion Markup Language (SAML). For example, the authentication token 172 includes an OAuth token or a SAML token.

Figure 4:
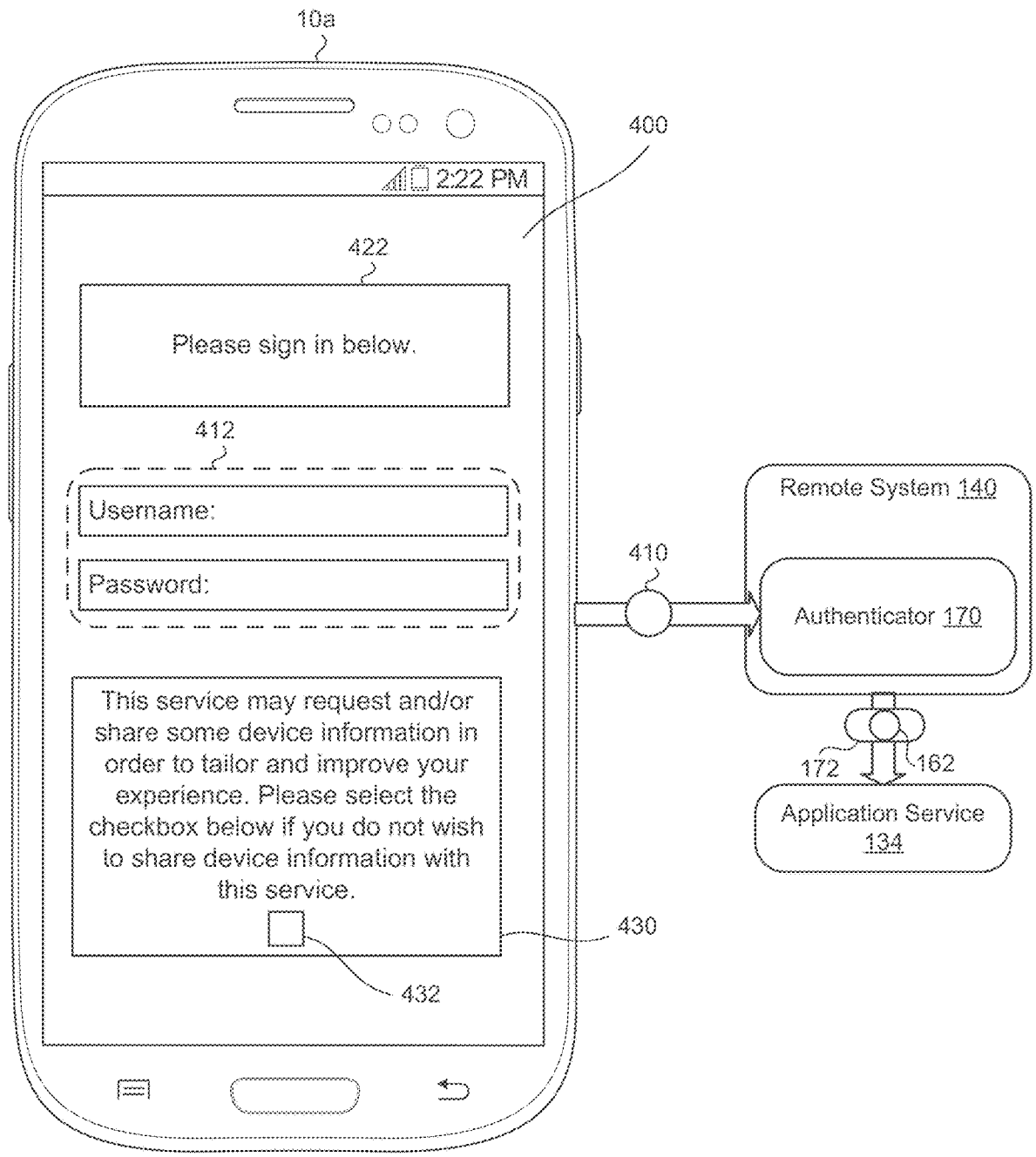
FIG. 4 is a schematic view of an authenticator for obtaining authentication credentials from a user of a user device.

The authenticator 170 obtains authentication credentials 20 from the user device 10 that verify the identity of the user 12. For example, the authentication credentials 20 include a username, a password, a one-time code (such as for two-factor authentication), biometric information, or any other information that the authenticator 170 and user 12 have agreed are sufficient to authenticate the identity of the user 12. As discussed in more detail below, the authenticator 170 may receive the authentication credentials 20 in response to prompting the user 12 via, for example, a display of the user device 10, to provide the authentication credentials 20. The remote system 140 may issue a credentials request 134 to the user device 10 to prompt the user 12 and/or user device to provide the authentication credentials 20. In some examples, the credentials request 134 includes a request for consent to share the device information (FIG. 4).

The remote system 140 may receive the device information 14 along with the authentication credentials 20. That is, each time the user device 10 submits authentication credentials 20 to the remote system 140, the user device 10 may also simultaneously include the device information 14. Additionally or alternatively, the remote system 140 receives the device information 14 independently from the authentication credentials 20 (e.g., at regular intervals) The device information 14 may change or update as changes are made to the user device 10 (e.g., patches are applied to the OS) The user device 10 may transmit the updated device information 14 to the remote system 140 based on such changes.

The authenticator 170, in response to receiving the authentication credentials 20, generates an authentication token 172 (i.e., an access token) acceptable for use with token-based authentication. The authentication token 172 provides the user device 10 access to the resource governed by the application service 130. The authenticator 170, in some implementations, includes the unique opaque ID 162 with the authentication token 172. For example, the authenticator 170 encodes or embeds the opaque ID 162 into the authentication token 172 as an additional attribute of the authentication token 172.

The remote system 140, in some examples, transmits the authentication token 172 to the application service 130. Alternatively, the remote system 140 transmits the authentication token 172 to the user device 10 which in turns transmits the authentication token 172 to the application service 130. The authentication token 172 permits the user device 10 to access the resource or service provided by the application service 130. Additionally, as discussed in more detail below, the authentication token 172, based on the included opaque ID 162, allows the application service 130 to adjust application interactions 136 with the user device 10.

Figure 2:
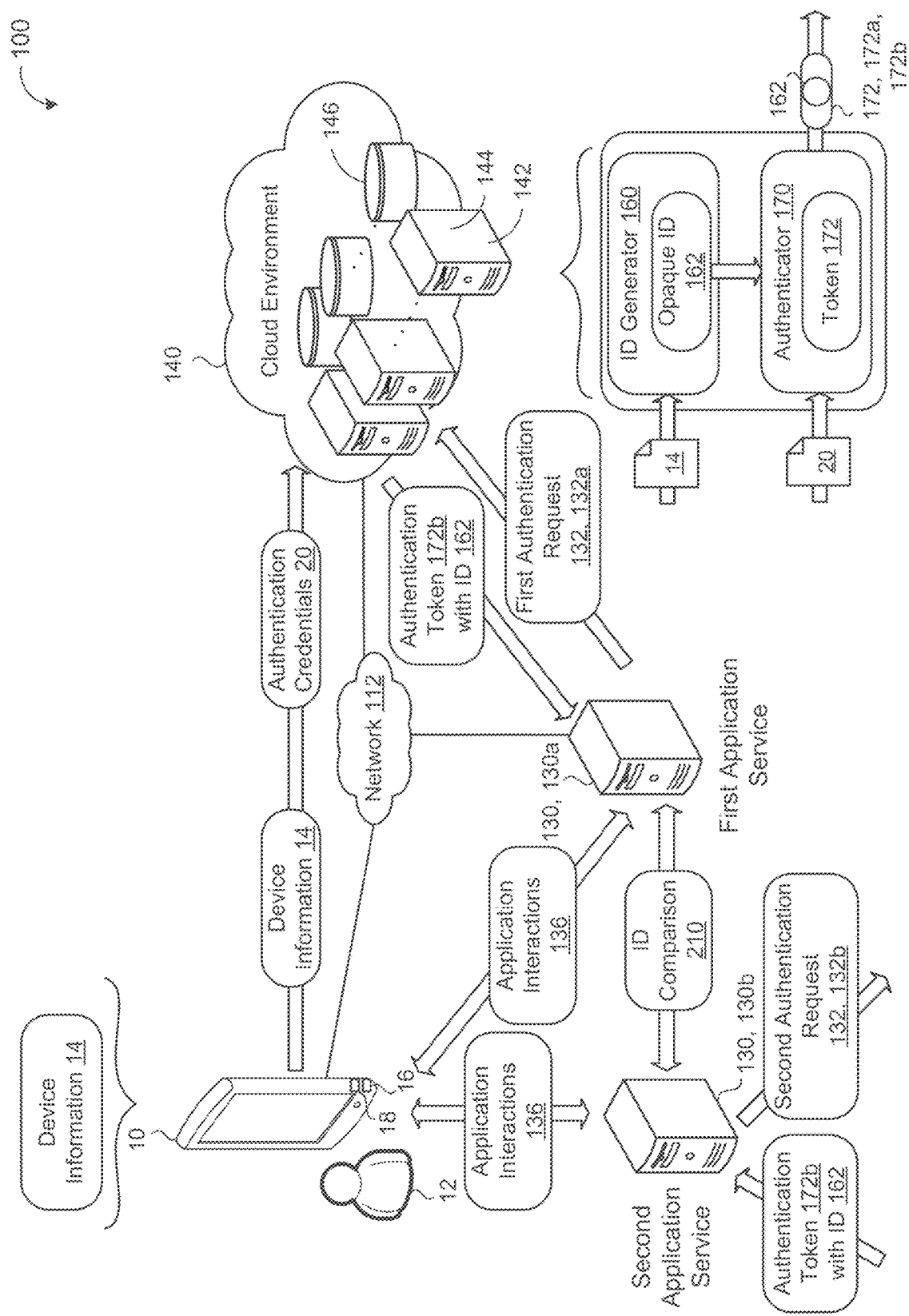
FIG. 2 is a schematic view of multiple application services sharing pervasive identification of a user device.

Referring now to FIG. 2, in some implementations, the system 100 includes a plurality of application services 130. Here, the system 100 includes a first application service 130, 130a and a second application service 130, 130b. Here, the application services 130 are illustrated as remote from the user device 10, but as discussed above, the application services 130 may execute on the user device 10 as well. In this example, the remote system 140, after receiving a first authentication request 132, 132a from the first application service 130a and generates a corresponding authentication token 172, 172a, the remote system 140 receives a second authentication request 132, 132b from the second application service 130b. The remote system 140 again retrieves the authentication credentials 20 and the device information 14 from the user device 10. In some examples, the remote system 140 determines that the device information 14 from the user device 10 in conjunction with the authentication credentials 20 (in response to the second authentication request 132b) is associated with the unique opaque ID 162 previously generated for the user device 10 and provided to the first application service 130a For example, the remote system 140 determines that the device information 14 matches (or nearly matches) the device information 14 associated with a previously generated opaque ID 162. The remote system 140 may determine whether the new device information 14 satisfies a comparison threshold when compared to the device information 14 associated with the opaque ID 162. When the new device information 14 satisfies the comparison threshold, the remote system 140 determines that the new device information 14 is associated with the previously generated opaque ID 162. In this example, the authenticator 170 generates a second authentication token 172, 172b and encodes the same unique opaque ID 162 previously transmitted to the first application service 130a based on the same or similar device information 14 received from the user device 10.

That is, because the user 12 used the same user device 10 to respond to both the first authentication request 132a and the second authentication request 132b, the device information 14 included with both authentication requests 132a, 132b is the same or similar. Thus, the remote system 140 may correlate the device information 14 received in response to both authentication requests 132a, 132b to the same unique opaque ID 162. Because the remote system 140 determines that the same user device 10 responded to both the first authentication request 132a and the second authentication request 132b, the remote system 140 encodes the same opaque ID 162 into both the first authentication token 172a and the second authentication token 172b. The remote system 140 transmits the second authentication token 172b to the second application service 130b.

In some implementations, the first application service 130a determines that the second application service 130b received the same unique opaque ID 162 as the first application service 130a The first application service 130a, based on the unique opaque ID 162, determines that the first application service 130a and the second application service 130b are interacting with the same user device 10. For example, the first application service 130a and the second application service 130b communicate an ID comparison 210 that informs both application services 130a, 130b that each received the same opaque ID 162. Alternatively, the remote system 140 may inform both the application services 130a, 130b of the matching opaque ID 162. Based on the common opaque ID 162, the application services 130a, 130b may infer that each are interacting with the same user device 10 without receiving any specific identifying information from the user 12 or user device 10. Either or both of the application services 130a, 130b may tailor their services to the user 12 and/or user device 10 based on the determination that each are interacting with the same user device 10.

Figure 3:
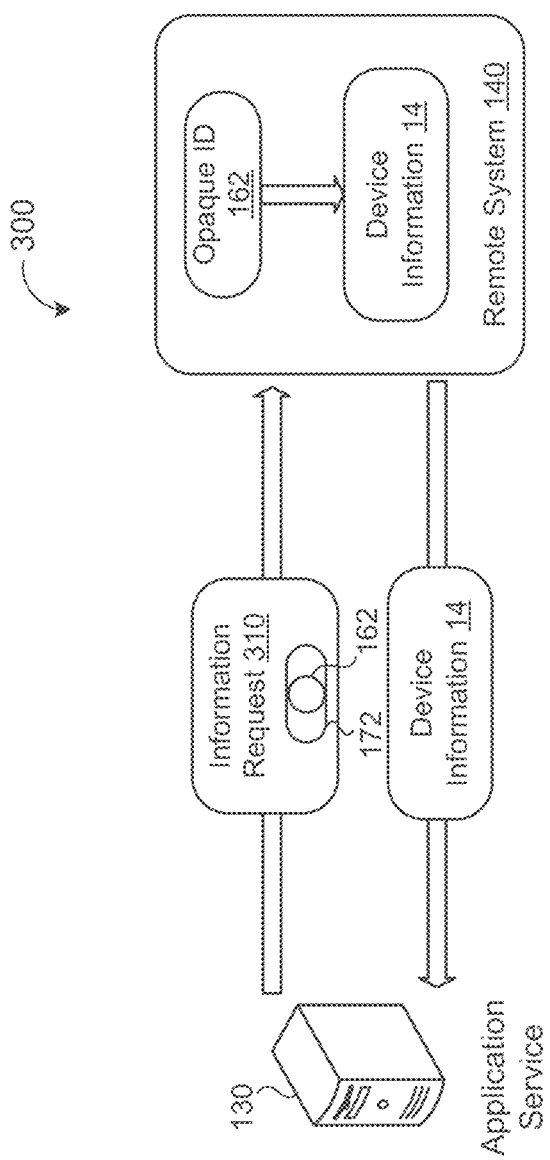
FIG. 3 is a schematic view of an application service requesting information from a remote system based on a pervasive identification of a user device.

Referring now to FIG. 3, in some implementations, schematic view 300 shows that the remote system 140 receives, from the application service 130, an information request 310 requesting a portion of the device information 14 of the user device 10. In some examples, the information request 310 includes the authentication token 172 along with the embedded opaque ID 162 that the application service 130 received from the remote system 140. The application service 130 includes the authentication token 172 and the opaque ID 162 to serve as an identifier for which user device 10 the application service 130 desires device information 14 about.

The remote system 140 determines the device information 14 that is associated with the opaque ID 162 received from the application service 130. For example, the remote system 140 accesses a database that correlates each generated opaque ID 162 with the corresponding device information 14. In some examples, the remote system 140 transmits at least a portion of the device information 14 associated with the user device 10 of the user 12 to the application service 130 based on the unique opaque ID 162. For example, the application service 130 desires to determine a security posture of the user device 10 and requests device information 14 associated with the patch level and version of the OS of the user device 10. The device information 14 that the remote system 140 transmits to the application service 130 may be based on consent received from the user 12 of the user device 10.

Referring now to FIG. 4, in some implementations, the remote system 140 is configured to invoke an authentication/authorization user interface 400 on the user device that prompts the user 12 to provide the authentication credentials 20 to the remote system 140. Here, the authentication user interface 204 includes a message 422 that indicates to the user 12 to "Please sign in below." The authentication user interface 400 also includes an authentication credential entry area 412 that provides the user 12 an interface for verifying their identity. For example, the authentication credential entry area 412 includes input text boxes for a user name and password, a biometric input (e.g., a fingerprint sensor), a two-factor authentication code entry box, or any other techniques for obtaining authentication and/or authentication credentials 20.

In some examples, the authentication/authorization user interface 400 includes a consent request area 430 that requests consent from the user 12 to allow the remote system 140 to potentially share some or all of the device information 14 with the application service 130. Here, the consent request area 430 includes a message that "This service may request and/or share some device information in order to tailor and improve your experience. Please select the checkbox below if you do not wish to share device information with this service." In this example, an input box 432 allows the user 12 to opt-out (i.e., not consent) to the sharing of the device information 14. In some examples, the user 12 tailors which portions of the device information 14 are eligible for sharing with application services 130 and which portions are not. The user 12 may tailor the preferences through the authentication/authorization user interface 400 or through account services or management via an account with the remote system 140. The device information 14 provided to the application services 130 from information requests 310 (FIG. 3) may be based on the consent received from the user 12. This consent may only be applicable to the specific user device 10 the user 12 used to provide the consent and to the specific application service 130 the user 12 is authenticating for. In some examples, the user 12 sets global consent settings with the remote system 140 which sets a default level of sharing allowed between the remote system 140 and application services 130 that the user 12 may tailor for each application service 130 individually.

In some examples, administrators of the user device 10 control the opaque ID 162 and the sharing of device information 14 between the remote system 140 and application services 130. For example, an administrator accesses an administrative policy user interface that communicates with the remote system 140. Additionally or alternatively, the user 12 may control the opaque ID 162 and the sharing of device information between the remote system 140 and application services 130 via a privacy preferences user interface that communicates with the remote system 140. User interfaces such as the administrator user interface and the privacy preferences user interface may provide the ability to granularly enable or disable sharing some or all of the device information 14 and/or the opaque ID 162 with some or all application services 130.

Figure 5:
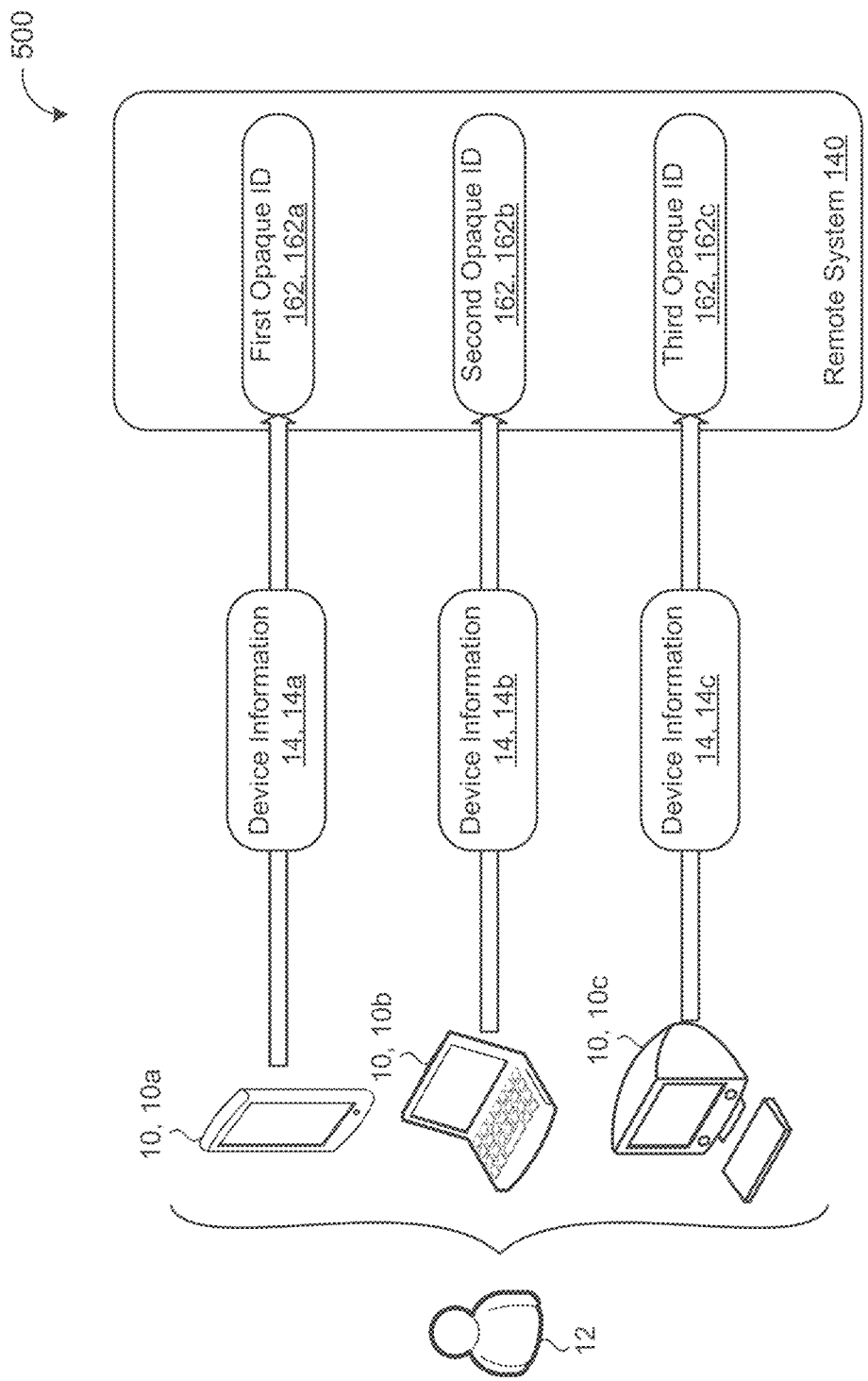
FIG. 5 is a schematic view of multiple pervasive identifications for multiple different user devices each associated with the same user.

Referring now to FIG. 5, in some examples, schematic view 500 shows the remote system 140 allowing the application service 130 to personalize services offered to a user 12 based on the particular user device 10 the user 12 is currently employing. For example, the application service 130 tailors the information they choose to provide to the user device 10 and/or tailors the actions that the user 12 is permitted to perform. As a specific example, a user 12 on a corporate owned user device 10 with a "good" health score (i.e., security posture) can view a file containing personally identifiable information with an application service whereas the same user 12 when using a personal user device that does not have the same good health score can only access files that are accessible to external parties.

In the example shown, the user 12 is associated with a plurality of user devices 10, 10a-c Here, the user 12 employs a mobile user device 10a, a laptop 10b, and a desktop 10c. The remote system 140 receives device information 14, 14a-c from each of these user devices 10a-c (e.g., when authenticating the user devices 10a-c for one or more application services 130) and generates separate unique opaque IDs 162, 162a-c for each user device 10a-c. Thus, when the user 12 authenticates with an application service 130 via a particular one of the user devices 10a-c, the application service 130 receives the opaque ID 162 associated with the particular user device 10 and the application service 130 may tailor its service accordingly.

Figure 6:
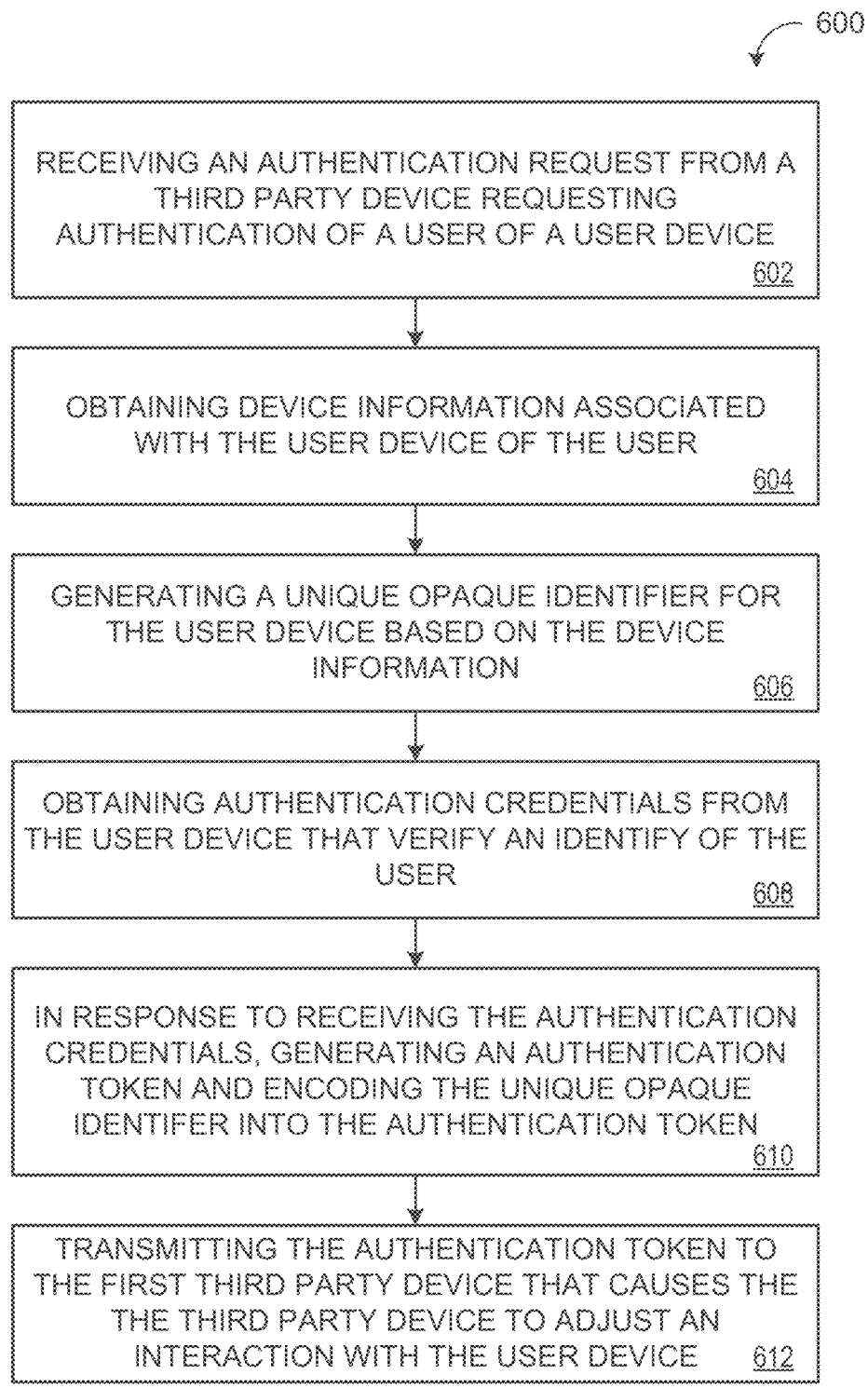
FIG. 6 is a flowchart of an example arrangement of operations for a method of pervasive resource identification.

FIG. 6 is a flowchart of an exemplary arrangement of operations for a method 600 for pervasive resource identification. The method 600, at operation 602, includes receiving, at data processing hardware 144, an authentication request 132 from an application service 130. The authentication request 132 requests authentication of a user 12 of a user device 10. The method 600, at operation 604, includes obtaining, at the data processing hardware 144, device information 14 associated with the user device 10 of the user 12. At operation 606, the method 600 includes generating, by the data processing hardware 144, a unique opaque identifier 162 for the user device 10 based on the device information 14.

At operation 608, the method 600 includes obtaining, at the data processing hardware 144, authentication credentials 20 from the user device 10. The authentication credentials 20 verify an identity of the user 12. In response to receiving the authentication credentials 20 from the user device 10, the method 600 includes, at operation 610, generating, by the data processing hardware 144, an authentication token 172 and encoding, by the data processing hardware 144, the unique opaque identifier 162 into the authentication token 172. At operation 612, the method 600 includes transmitting, by the data processing hardware 144, the authentication token 172 to the application service 130. The authentication token 172, when received by the application service 130, allows the first application service 130 to adjust an interaction 136 with the user device 10 based on the unique opaque identifier 162.

Figure 7:
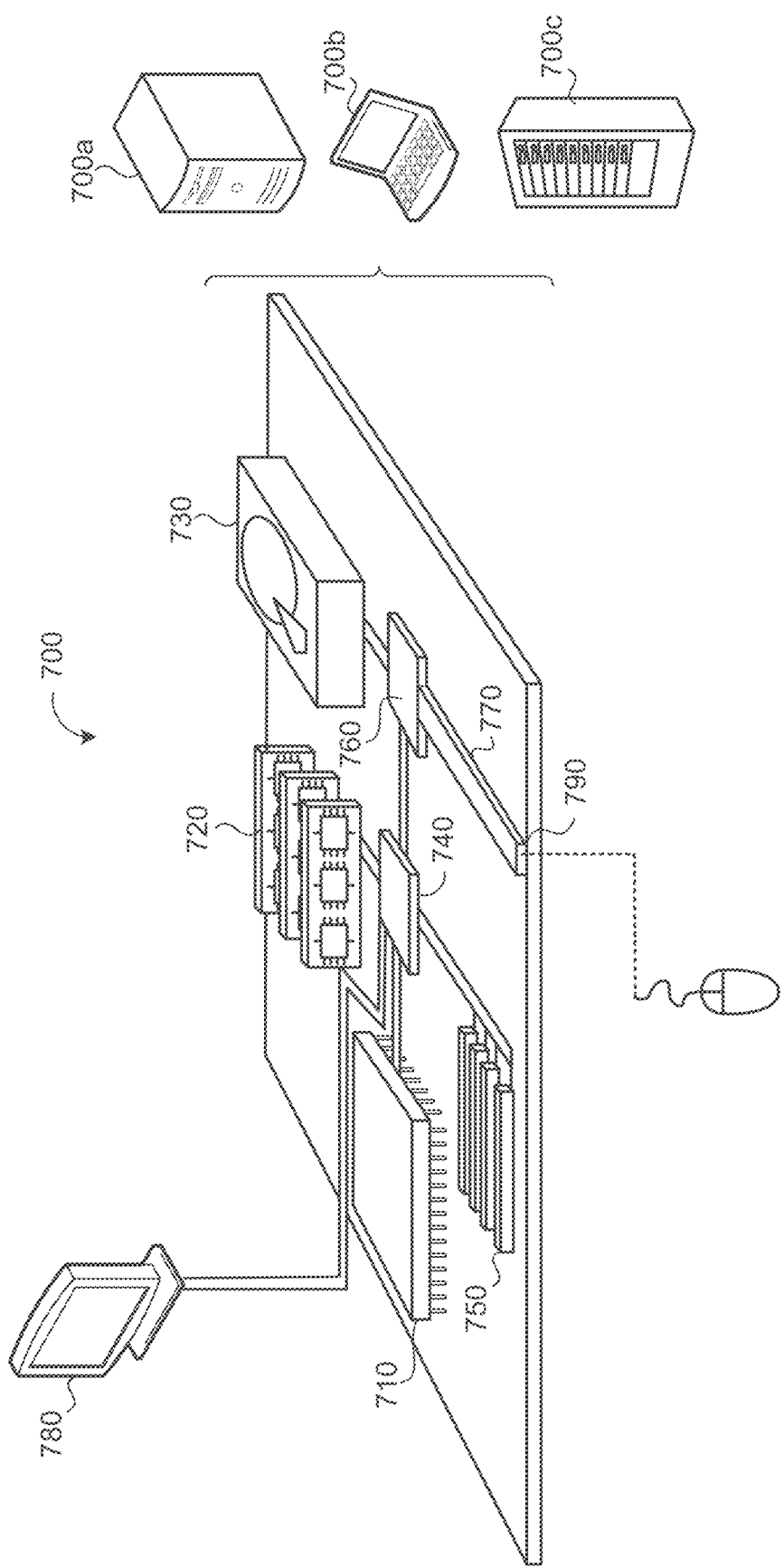
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s) The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM. EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described Nevertheless, it will be understood that various modifications may be made without departing from the spirit and scope of the disclosure. Accordingly, other implementations are within the scope of the following claims.

What is claimed is:

1. A method comprising:
receiving, at data processing hardware, an authentication request from a first application service, the authentication request requesting authentication of a user of a user device;
obtaining, at the data processing hardware, device information associated with the user device of the user;
generating, by the data processing hardware, a unique opaque identifier for the user device based on the device information;
obtaining, at the data processing hardware, authentication credentials from the user device, the authentication credentials verifying an identity of the user;
in response to receiving the authentication credentials from the user device:
generating, by the data processing hardware, an authentication token; and
encoding, by the data processing hardware, the unique opaque identifier for the user device into the authentication token;
transmitting, by the data processing hardware, the authentication token to the first application service, the authentication token when received by the first application service allowing the first application service to adjust an interaction with the user device based on the unique opaque identifier;
receiving, at the data processing hardware, a second authentication request from a second application service, the second authentication request requesting authentication of the user of the user device;
obtaining, at the data processing hardware, the device information associated with the user device of the user;
determining, by the data processing hardware, that the device information is associated with the unique opaque identifier of the user device;
generating, by the data processing hardware, a second authentication token;
encoding, by the data processing hardware, the unique opaque identifier into the second authentication token; and
transmitting, by the data processing hardware, the second authentication token to the second application service.

2. The method of claim 1, wherein:
the first application service determines that the second application service received the same unique opaque identifier as the first application service; and
the first application service determines, based on the unique opaque identifier, that the first application service and the second application service are interacting with the same user device.

3. The method of claim 1, further comprising:
receiving, by the data processing hardware, an information request from the first application service requesting the device information, the information request including the unique opaque identifier; and
transmitting, by the data processing hardware, to the first application service, at least a portion of the device information associated with the user device of the user based on the unique opaque identifier.

4. The method of claim 1, further comprising, after receiving the authentication request from the first application service:
transmitting, by the data processing hardware, a credentials request to the user device requesting the authentication credentials and user consent to share the device information associated with the user device with the first application service; and
receiving, by the data processing hardware, a response to the credentials request comprising the authentication credentials and the user consent.

5. The method of claim 1, wherein the device information comprises at least one of: a web cookie of the user device; an Internet Protocol address of the user device; or an operating system version of the user device.

6. The method of claim 1, wherein the authentication token comprises a federated identity token.

7. The method of claim 6, wherein the federated identity token comprises one of an OAuth token or a Security Assertions Markup Language (SAML) token.

8. The method of claim 6, wherein the federated identity token comprises a proprietary or standards-based federated identity systems token.

9. The method of claim 1, where encoding the unique opaque identifier into the authentication token comprises adding the unique opaque identifier as an attribute of the authentication token.

10. The method of claim 1, wherein:
the user is associated with a plurality of user devices, and
each user device of the plurality of user devices is associated with a different unique opaque identifier.

11. A system comprising:
data processing hardware; and
memory hardware in communication with the data processing hardware, the memory hardware storing instructions that when executed on the data processing hardware cause the data processing hardware to perform operations comprising:
receiving an authentication request from a first application service, the authentication request requesting authentication of a user of a user device;
obtaining device information associated with the user device of the user;
generating a unique opaque identifier for the user device based on the device information;
obtaining authentication credentials from the user device, the authentication credentials verifying an identity of the user;
in response to receiving the authentication credentials from the user device:
generating an authentication token; and
encoding the unique opaque identifier for the user device into the authentication token;
transmitting the authentication token to the first application service, the authentication token when received by the first application service allowing the first application service to adjust an interaction with the user device based on the unique opaque identifier;
receiving, at the data processing hardware, a second authentication request from a second application service, the second authentication request requesting authentication of the user of the user device;
obtaining, at the data processing hardware, the device information associated with the user device of the user;
determining, by the data processing hardware, that the device information is associated with the unique opaque identifier of the user device;
generating, by the data processing hardware, a second authentication token;

encoding, by the data processing hardware, the unique opaque identifier into the second authentication token; and transmitting, by the data processing hardware, the second authentication token to the second application service.

12. The system of claim 11, wherein:

the first application service determines that the second application service received the same unique opaque identifier as the first application service; and the first application service determines, based on the unique opaque identifier, that the first application service and the second application service are interacting with the same user device.

13. The system of claim 11, wherein the operations further comprise:

receiving an information request from the first application service requesting the device information, the information request including the unique opaque identifier; and transmitting, to the first application service, at least a portion of the device information associated with the user device of the user based on the unique opaque identifier.

14. The system of claim 11, wherein the operations further comprise, after receiving the authentication request from the first application service:

transmitting a credentials request to the user device requesting the authentication credentials and user consent to share the device information associated with the user device with the first application service; and receiving a response to a credentials request comprising the authentication credentials and the user consent.

15. The system of claim 11, wherein the device information comprises at least one of: a web cookie of the user device; an Internet Protocol address of the user device; or an operating system version of the user device.

16. The system of claim 11, wherein the authentication token comprises a federated identity token.

17. The system of claim 16, wherein the federated identity token comprises one of an OAuth token or a Security Assertions Markup Language (SAML) token.

18. The system of claim 16, wherein the federated identity token comprises a proprietary or standards-based federated identity systems token.

19. The system of claim 11, where encoding the unique opaque identifier into the authentication token comprises adding the unique opaque identifier as an attribute of the authentication token.

20. The system of claim 11, wherein:

the user is associated with a plurality of user devices, and each user device of the plurality of user devices is associated with a different unique opaque identifier.

* * * * *